United States Patent
Chahwan et al.

(10) Patent No.: US 8,315,006 B1
(45) Date of Patent: Nov. 20, 2012

(54) ADAPTIVE DATA WRITING MODE BASED ON DRIVE ENVIRONMENT

(75) Inventors: Alain Chahwan, Mission Viejo, CA (US); Hien T. Chu, Santa Ana, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 59 days.

(21) Appl. No.: 12/720,568

(22) Filed: Mar. 9, 2010

(51) Int. Cl. 
 *G11B 21/02* (2006.01)
(52) U.S. Cl. ............ 360/75; 360/48; 360/60; 360/78.04
(58) Field of Classification Search ................ None
See application file for complete search history.

(56) References Cited

U.S. PATENT DOCUMENTS

| | | | |
|---|---|---|---|
| 5,333,138 A | 7/1994 | Richards et al. | |
| 6,115,200 A | 9/2000 | Allen et al. | |
| 6,429,990 B2 | 8/2002 | Serrano et al. | |
| 6,754,021 B2 | 6/2004 | Kisaka et al. | |
| 6,909,574 B2 | 6/2005 | Aikawa et al. | |
| 7,079,348 B2 | 7/2006 | Ishii et al. | |
| 7,142,385 B2 | 11/2006 | Shimotono et al. | |
| 7,170,700 B1 * | 1/2007 | Lin et al. | 360/31 |
| 7,184,241 B1 | 2/2007 | Mallary et al. | |
| 7,529,058 B2 * | 5/2009 | Hara et al. | 360/31 |
| 7,545,593 B1 * | 6/2009 | Sun et al. | 360/60 |
| 7,570,445 B2 * | 8/2009 | Alfred et al. | 360/78.04 |
| 7,685,360 B1 | 3/2010 | Brunnett et al. | |
| 7,752,491 B1 | 7/2010 | Liikanen et al. | |
| 7,760,455 B2 * | 7/2010 | Kang et al. | 360/60 |
| 2005/0141129 A1 * | 6/2005 | Schmidt et al. | 360/77.08 |
| 2006/0215307 A1 * | 9/2006 | Yoshida et al. | 360/75 |

FOREIGN PATENT DOCUMENTS

| | | | |
|---|---|---|---|
| JP | 2001135018 A | * | 5/2001 |
| JP | 2003016745 A | * | 1/2003 |

* cited by examiner

*Primary Examiner* — Hoa T Nguyen
*Assistant Examiner* — James L Habermehl (57) ABSTRACT

Systems and methods for writing data to a disk under write disturbance conditions are provided. In one embodiment, a disk drive comprises a disk and a detection system configured to detect a write disturbance condition. The disk drive further comprises a controller configured to alternately operate in a normal mode and a write disturbance mode, wherein, the controller is configured to write data to data tracks on the disk in the normal mode and to write data to data tracks on the disk that are spaced farther apart in the write disturbance mode, and the controller is configured to switch from the normal mode to the write disturbance mode when the detection system detects the write disturbance condition.

27 Claims, 6 Drawing Sheets

ADAPTIVE DATA WRITING MODE BASED ON DRIVE ENVIRONMENT

BACKGROUND

Data storage devices are commonly used to store data in computers, data bases, digital video recorders, and other devices. Data storage devices may include hard disks, solid state memory, or other types of memory.

Write disturbances, such as vibrations, are becoming an increasing problem for disk drives as the number of tracks per inch (TPI) is increased for higher storage capacity. For example, a write disturbance can cause a transducer head of the disk drive to deviate from a desired data track and overwrite an adjacent data track, resulting in a loss of data. To compensate for write disturbances, a disk drive may employ an adaptive compensation scheme that generates a position error signal (PES) indicating the deviation of the head position from a desired track and feeds the PES into a servo control loop that adjusts the head position accordingly to maintain the head on the desired track.

When the disk drive is subjected to high vibrations or other write disturbance condition and compensation is not enough, the disk drive may be unable to write data to a disk in response to a write command from a host (e.g., host processor). If the disk drive is unable to execute the write command for a period of time, then the host may timeout and/or reboot.

Accordingly, there is a need for disk drives that are capable of writing data under write disturbance conditions.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
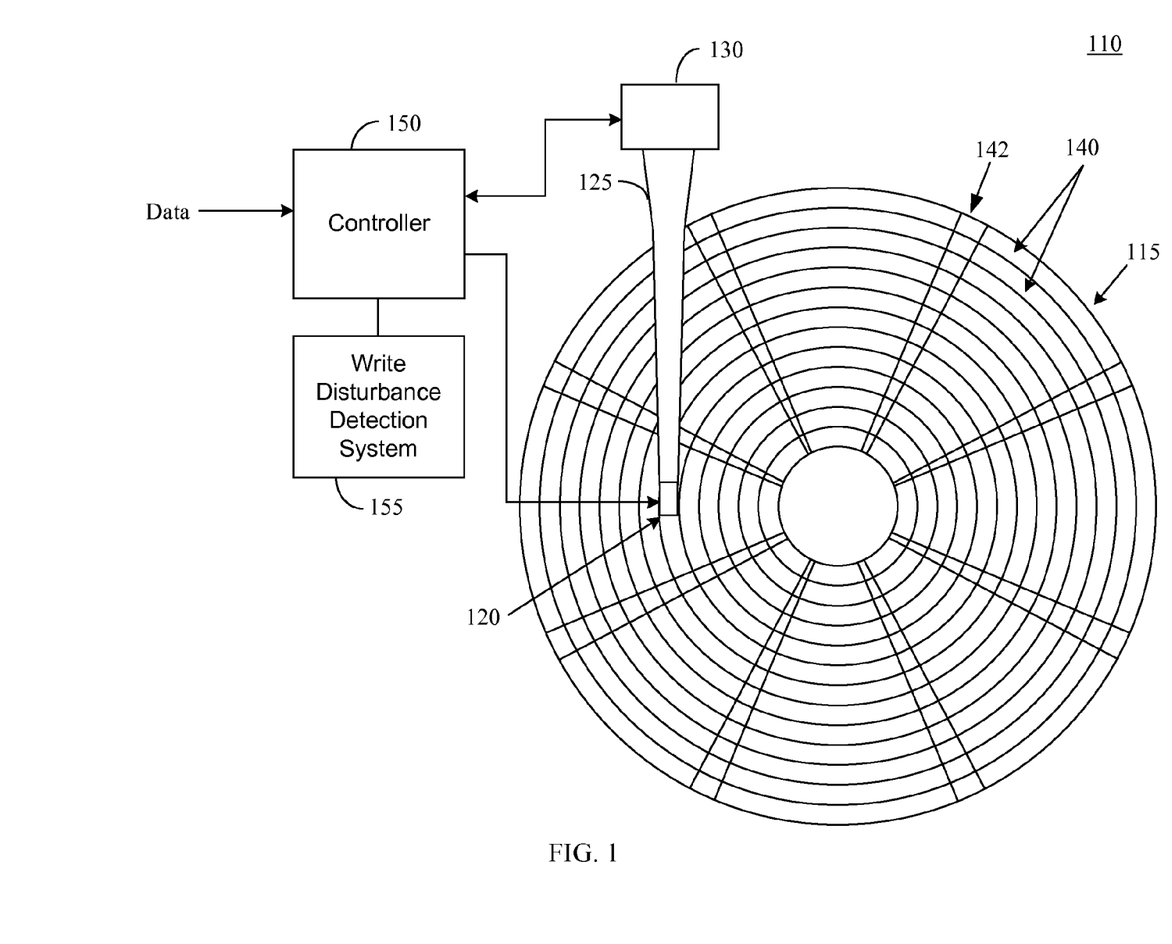
FIG. 1 is a block diagram of a disk drive according to an embodiment of the present invention.

FIG. 1 shows a disk drive 110 according to an embodiment of the present invention. The disk drive 110 comprises a controller 150 that performs various operations of the disk drive 110 described below. The controller 150 may be implemented using one or more processors for executing instructions and may further include memory, such as a volatile or non-volatile memory, for storing data (e.g., data being processed) and/or instructions. The instructions may be executed by the one or more processors to perform the various functions of the controller 150 described below. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk drive 110 also comprises a rotating magnetic disk 115 and a head 120 connected to the distal end of an actuator arm 125, which is rotated about a pivot by a voice coil motor (VCM) 130 to position the head 120 radially over the disk 115. The disk 115 comprises a number of concentric data tracks 140, each partitioned into a number of data sectors. To write data to the disk 115, the controller 150 positions the head 120 over a desired data track using the VCM 130 and sends the data to the head 120, which magnetically writes the data to the desired track of the disk 115.

The disk 115 may include servo information on each track 140 for determining the position of the head 120 over the disk 115. The servo information may be located in embedded servo wedges 142 on the disk 115. The controller 150 may read the servo information from the disk 115 using the head 120 and generate a position error signal (PES) based on the read servo information. The PES indicates the relative position of the head 120 from the desired track on the disk 115. The controller 150 may include a servo control loop (not shown) that receives the PES and adjusts the position of the head 120 accordingly using the VCM 130 to maintain the head 120 on the desired track.

The disk drive 110 includes a write disturbance detection system 155 configured to detect the presence of a write disturbance condition and to output a write disturbance signal to the controller 150 when a write disturbance condition is detected. The write disturbance condition may be associated with physical vibrations and/or shock, magnetic field noise, electromagnetic interference or other disturbance that can impact write performance. For example, when the disk drive 110 is within an electronic music player, audio-induced vibrations may propagate to the disk drive 110.

The write disturbance detection system 155 may employ various techniques to detect a write disturbance condition. For the example of vibrations, the write disturbance detection system 155 may detect vibrations using one or more vibration sensors (e.g., accelerometers). In another example, the write disturbance detection system 155 may receive the PES from the controller 150 and detect a write disturbance condition by analyzing the PES, as discussed further below. Other examples of techniques for detecting a write disturbance condition are provided below.

In one embodiment, the disk 115 may include an area for data write operations under write disturbance conditions. When the write disturbance detection system 155 detects a write disturbance condition, the controller 150 may write data to this area of the disk 115. Data writes to this area of the disk 115 may be made during write disturbances by writing data to tracks that are spaced farther apart compared with normal write operations. The increased track spacing allows the head 120 to deviate farther from a desired track without overwriting and/or corrupting data on adjacent tracks.

Figure 2:
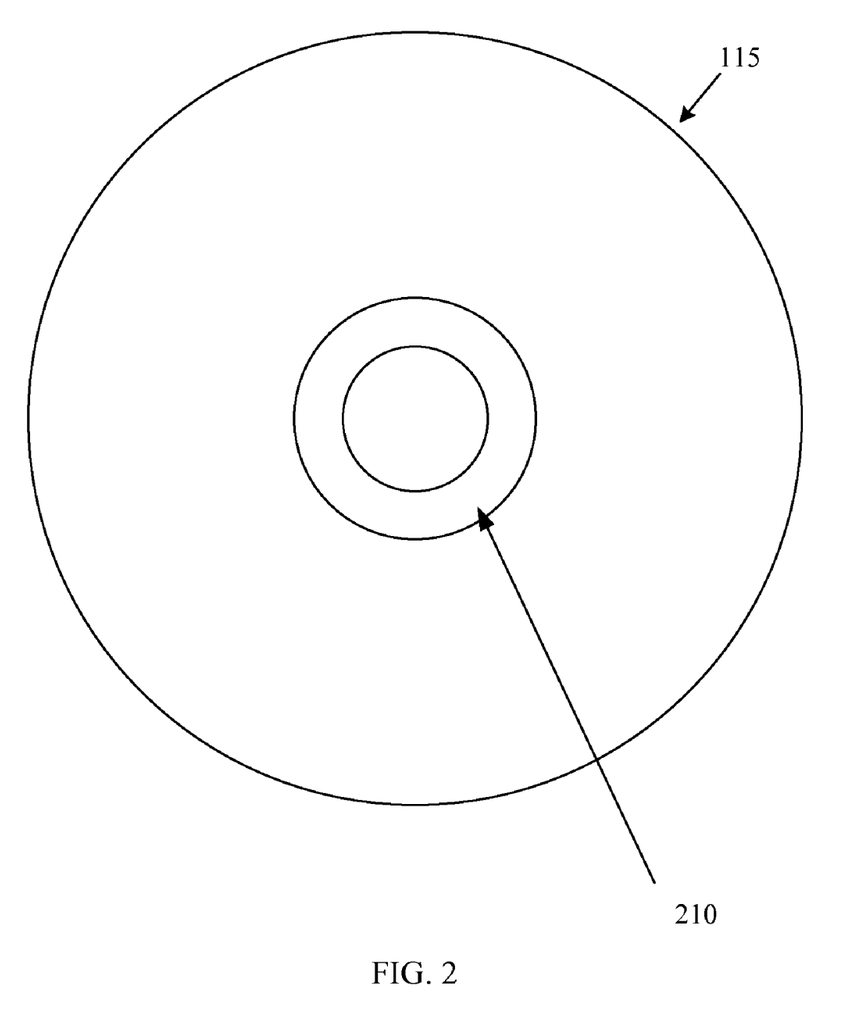
FIG. 2 shows an example of an area of a disk allocated for write operations during write disturbance conditions according to an embodiment of the present invention.

FIG. 2 shows an example of an area 210 of the disk 115 that may be allocated for write operations during detected write disturbance conditions. The area 210 may be a continuous area on the disk 115, as shown in the example in FIG. 2, or comprise multiple areas distributed at different locations on the disk 115. The area 210 may be located anywhere on the disk 115. The example in FIG. 2 shows the area 210 located toward the inner diameter of the disk 115. Further, the area 210 may include any number of tracks.

Figure 3A:
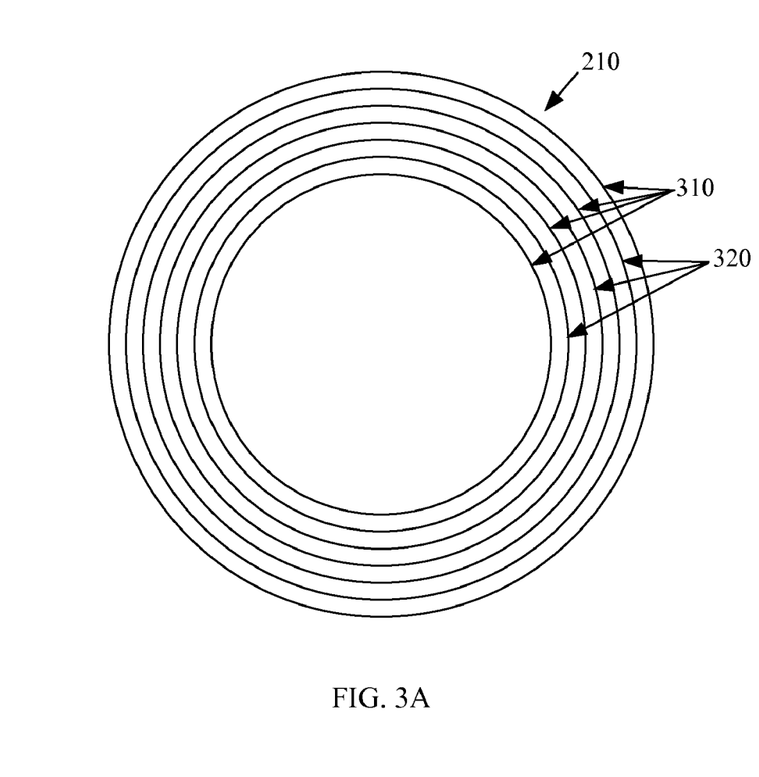
FIG. 3A shows an example of writing data to tracks that are spaced farther apart during a write disturbance condition by writing to every other track according to an embodiment of the present invention.

In one embodiment, the area 210 of the disk 115 may have a similar TPI as an area of the disk 115 used for normal write operations. In this embodiment, the controller 150 may write to tracks that are spaced farther apart by skipping over tracks during a write operation. For example, the controller 150 may write data to every other track, effectively doubling the spacing between tracks to which data is written. An example of this is shown in FIG. 3A, in which the controller 150 writes to every other track 310 by skipping tracks 320. In general, the controller 150 may write data to every $n^{th}$ data track in this area of the disk 115, where n is equal to or greater than two.

Figure 3B:
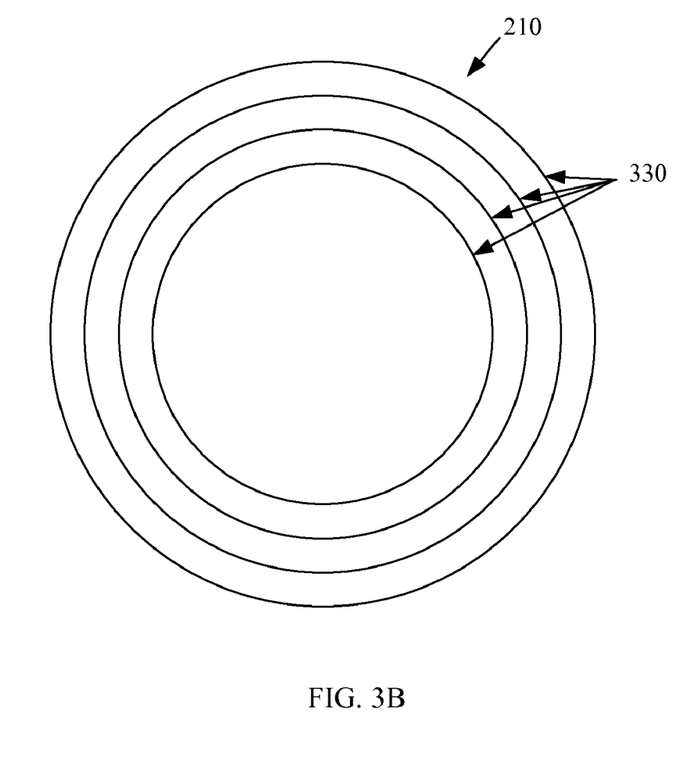
FIG. 3B shows an example of writing to tracks that are spaced farther apart during a write disturbance condition by reducing the tracks per inch (TPI) according to an embodiment of the present invention.

In another embodiment, the area 210 of the disk 115 may have a reduced TPI compared with an area of the disk 115 used for normal write operations. The lower TPI translates into tracks that are spaced farther apart. An example of this is shown in FIG. 3B, in which the tracks 330 are spaced farther apart compared with the example in FIG. 3A because of a lower TPI.

In another embodiment, the controller 150 may dynamically adjust the spacing between tracks to which data is written. For example, when a write disturbance condition is detected, the controller 150 may start writing data to every $n^{th}$ track on the disk 115 at or near the current location of the head 120. The controller 150 may also dynamically lower the TPI for tracks being written to during a detected write disturbance condition.

Thus, when a write disturbance condition is detected, the controller 150 may write data to tracks that are spaced farther apart compared with normal write operations using any one of the methods discussed above or other method. The increased track spacing increases robustness to write disturbances by providing more room for the head 120 to deviate from a desired track without overwriting and/or corrupting data on adjacent tracks. This allows the disk drive 110 to continue to write data to the disk 115 in response to a host command during a detected write disturbance condition, thereby preventing the host from timing out and/or rebooting.

In one embodiment, the controller 150 may switch between operation in a normal mode and a write disturbance mode. When the write disturbance detection system 155 does not detect a write disturbance condition, the controller 150 may write data to the disk 115 in the normal mode. In this mode, the controller 150 writes data to tracks on the disk 115 that are spaced close together for high disk storage capacity. When the write disturbance detection system 155 detects a write disturbance condition, the controller 150 may switch to the write disturbance mode. In this mode, the controller 150 writes data to tracks on the disk 115 that are spaced farther apart compared with the normal mode. This increases the tolerance of the disk drive 110 to the write disturbance condition. For example, the track spacing for data writes in the write disturbance mode may be 50% or more greater compared with the normal mode. The controller 150 may operate in the write disturbance mode for the duration of the detected write disturbance condition. At the end of the detected write disturbance condition, the controller 150 may switch back to the normal mode.

In one embodiment, the controller 150 may write to a normal write area of the disk 115 in the normal mode and to a write disturbance area of the disk 115 in the write disturbance mode. Within the normal write area, the controller 150 may write data to tracks that are spaced close together for high disk storage capacity. Within the write disturbance area, the controller 150 may write data to tracks that are spaced farther apart to increase the tolerance of the disk drive 110 to a write disturbance condition. After a write disturbance condition ends, the controller 150 may transfer or relocate the data that was written in the write disturbance area of the disk 115 during the write disturbance condition to the normal write area of the disk 115. The data transfer clears space in the write disturbance area for subsequent write disturbance conditions, allowing the write disturbance area to be relatively small. The controller 150 may perform the data transfer by reading data from the write disturbance area of the disk 115 and writing the read data back to the disk 115 in the normal write area. The controller 150 may perform the data transfer during an idle state (e.g., no host command) of the disk drive 110 so that the data transfer does not impact the performance of a read and/or write command from the host.

In one embodiment, the host may address data associated with write and read commands to the disk drive 110 using logical block addresses (LBAs). When the controller 150 writes data to the disk 115 in response to a write command from the host, the controller 150 may maintain an address table mapping the LBAs of the data with physical addresses of the data on the disk 115. The address table may be stored in RAM, solid state memory, or other type of memory. In this embodiment, the controller 150 may also maintain a write disturbance table that keeps track of data that is written to the write disturbance area of the disk 115. The write disturbance table may map the LBAs of the data with the physical addresses of the data in the write disturbance area of the disk 115. The controller 150 may also maintain a flag indicating whether data is currently stored in the write disturbance area of the disk 115.

When the controller 150 writes data to the write disturbance area of the disk 115 during a write disturbance condition, the controller 150 updates the write disturbance table to map the LBAs of the data to the physical addresses of the data in the write disturbance area. The controller 150 may also set the flag to indicate that data is stored in the write disturbance area. When the controller 150 later transfers the data in the write disturbance area to the normal write area of the disk 115, the controller 150 may update the address table to map the LBAs of the data to the physical addresses of the data in the normal write area of the disk 115. The controller 150 may then clear or invalidate the address entries for the data in the write disturbance table since the data has been transferred to the normal write area. The controller 150 may also reset the flag to indicate that no data is currently stored in the write disturbance area of the disk 115. In this embodiment, when the controller 150 receives a read command from the host, the controller 150 may determine whether the requested data is stored in the write disturbance area of the disk 115 by looking at the flag setting. If the flag indicates that no data is stored in the write disturbance area, then the controller 150 may look in the address data to locate the requested data on the disk 115. If the flag indicates that data is stored in the write disturbance area, then the controller 150 may first look in the write disturbance table to determine whether the requested data is stored in the write disturbance area. If the requested data is not in the write disturbance area, then the controller 150 may look in the address table to locate the requested data in the normal write area of the disk 115.

Figure 4:
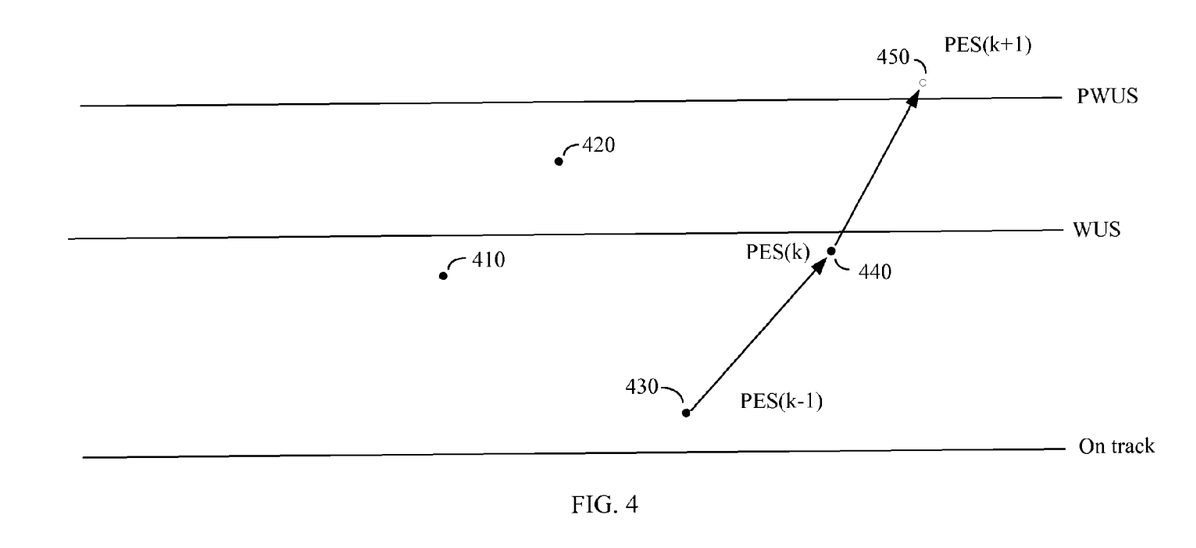
FIG. 4 is a plot showing an example of a position error signal (PES) according to an embodiment of the present invention.

In one embodiment, the controller 150 may use the PES to determine whether the head 120 is on track during a write operation. For example, the controller 150 may compare the PES with a write unsafe (WUS) limit to determine whether the head 120 is on track. In this example, the controller 150 may determine that the head 120 is on track when the PES is below the WUS limit, and determine that the head 120 is off track when the PES is equal to or above the WUS limit. When the head 120 is determined to be off track, the controller 150 may abort the current write operation to the disk 115 to prevent overwriting an adjacent track. The controller 150 may resume the write operation to the disk 115 when the PES drops back below the WUS limit. FIG. 4 shows an example of a PES value 410 below the WUS limit and a PES value 420 above the WUS limit, in which case the current write operation is aborted. The WUS limit may be given as a percent of the data track pitch.

In one embodiment, the controller 150 may also predict the PES at a future time based on the current PES and the PES at a past time. For example, the predicted PES may be determined as follows:

$$PES(k+1) = 2 \cdot PES(k) - PES(k-1) \qquad (1)$$

where $PES(k+1)$ is the predicted PES at time k+1, $PES(k)$ is the current PES at time k, and $PES(k-1)$ is the PES at past time k−1. The controller 150 may use the predicted PES to determine whether the head 120 will be on track or off track at a future time by comparing the predicted PES with a predicted write unsafe (pWUS) limit. In this example, the controller 150 may determine that the head 120 will go off track when the predicted PES is equal to or above the pWUS limit, in which case the controller 150 may abort the current write operation to the disk 115. FIG. 4 shows an example of a current PES value 440 at time k, a PES value 430 at past time k−1, and a predicted PES value 450 at time k+1 based on the PES values 430 and 440. In this example, the predicted PES is above the pWUS limit and the controller 150 may abort the current write operation even though the current PES is below the WUS limit.

In one embodiment, the controller 150 may use different WUS limits in the normal mode and the write disturbance mode in determining whether to abort a write operation based on the PES. For example, the controller 150 may use a higher WUS limit in the write disturbance mode than the normal mode. This is because the tracks are spaced father apart in the write disturbance mode, which allows the disk drive 110 to tolerate a larger deviation of the head position from the desired track. Thus, the WUS limit may be relaxed in the write disturbance mode. The controller 150 may also use different pWUS limits in the normal mode and the write disturbance mode, with the pWUS limit in the write disturbance mode being higher.

Figure 5:
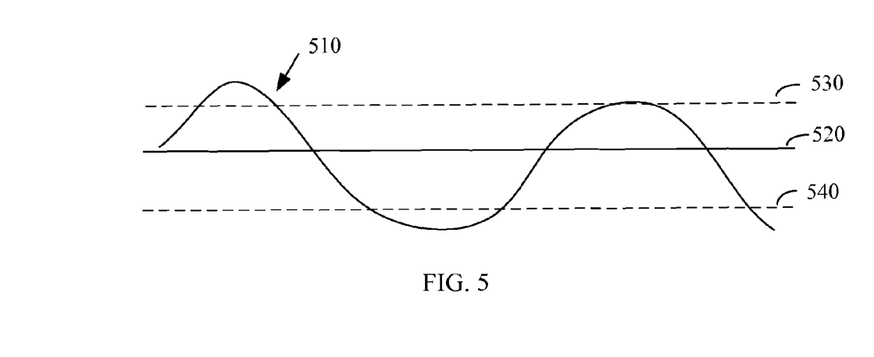
FIG. 5 shows an example of a read operation comprising on-track and off-track reads according to an embodiment of the present invention.

In one embodiment, the controller 140 may read data from a track in the write disturbance area of the disk 115 by performing both on-track and off-track reads. FIG. 5 shows an example of data 510 written to a track 520 in the write disturbance area during a detected write disturbance condition. In this example, the data 510 deviates from the track 520 due to the write disturbance condition (e.g., vibrations). The controller 150 may first perform an on-track read to read portions of the data 510 that are located at or near the track 520. If the on-track read fails to read all of the data on the track 520, then the controller 150 may perform off-track reads at offsets 530 and 540 from the track 520 to read portions of the data 510 located farther away from track 520. After performing the on-track and off-track reads, the controller 150 may combine the different portions of the data 510 obtained from the on-track and off-track reads to obtain the complete data 510. The controller 140 may perform the on-track and off-track reads during an idle state (e.g., no host command) to transfer the data from the write disturbance area to the normal write area of the disk 115.

Figure 6:
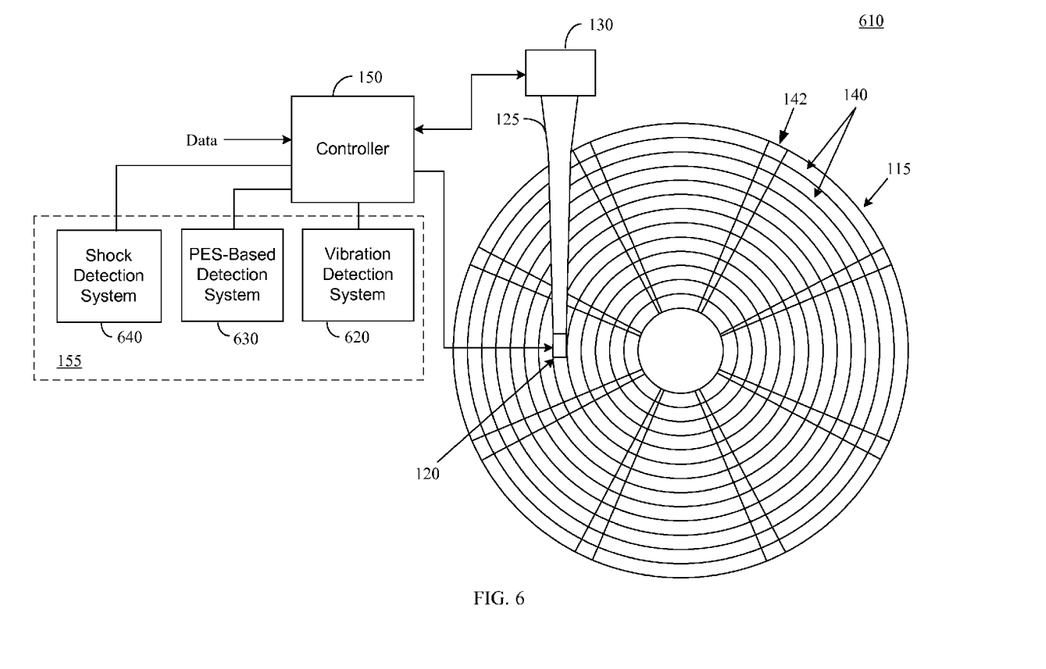
FIG. 6 is a block diagram of a disk drive according to another embodiment of the present invention.

FIG. 6 shows a disk drive 610 according to an embodiment of the present invention. In this embodiment, the write disturbance detection system 155 may include a vibration detection system 620, a PES-based detection system 630, and/or a shock detection system 640. The write disturbance detection system 155 may output a write disturbance signal to the controller 150 when any one or a combination of the systems 620, 630 and 640 detects a write disturbance condition.

The vibration detection system 620 may include one or more vibration sensors (e.g., accelerometers). For example, the vibration detection system 620 may include rotational acceleration feed forward (RAFF) sensors which can detect linear and rotational vibrations in the disk drive 110. The vibrations detection system 620 may also be configured to receive vibration sensor signals from vibration sensors external to the disk drive 110. The vibration detection system 620 may use various techniques to detect a write disturbance condition based on vibration sensor signals from the one or more vibration sensors. For example, the vibration detection system 620 may detect a write disturbance condition when the magnitude of a vibration sensor signal exceeds a threshold, the average magnitude of the vibration sensor signal over a period of time exceeds a threshold, and/or other measure of the vibration sensor signal exceeds a threshold.

The PES-based detection system 630 may be configured to receive the PES from the controller 150 and detect a write disturbance condition based on the PES. For example, the PES-based detection system 630 may determine a variation of the PES over a period of time and detect a write disturbance condition when the variation of the PES exceeds a threshold. In one embodiment, the variation of the PES may be determined by computing a standard deviation of the PES over the period of time. A large variation in the PES may be associated with physical vibrations, magnetic field noise, electromagnetic field noise, or other source.

The shock detection system 640 may be configured to detect shock events using one or more shock sensors. The shock events may include drive/chassis thermal popping and notebook disturbances such as typing, taping and cover-closing, which may exceed the shock specifications of the disk drive in frequency range and/or amplitude. The thermal popping may be caused by dissimilar coefficients of thermal expansion among different components inside and outside of the disk drive 110. Each time the shock detection system 640 detects a shock event, the shock detection system 640 may send a signal to the controller 150 to abort a write operation to the disk 115 to prevent adjacent track overwrite. The write operation may resume after the shock event passes.

In one embodiment, the shock detection system 640 may monitor a number of detected shock events over a time window and detect a write disturbance condition when the number of detected shock events exceeds a threshold. In another embodiment, the shock detection system 640 may monitor a number of write aborts that are triggered in response to detected shock events over a time window and detect a write disturbance condition when the number of write aborts exceeds a threshold.

Figure 7:
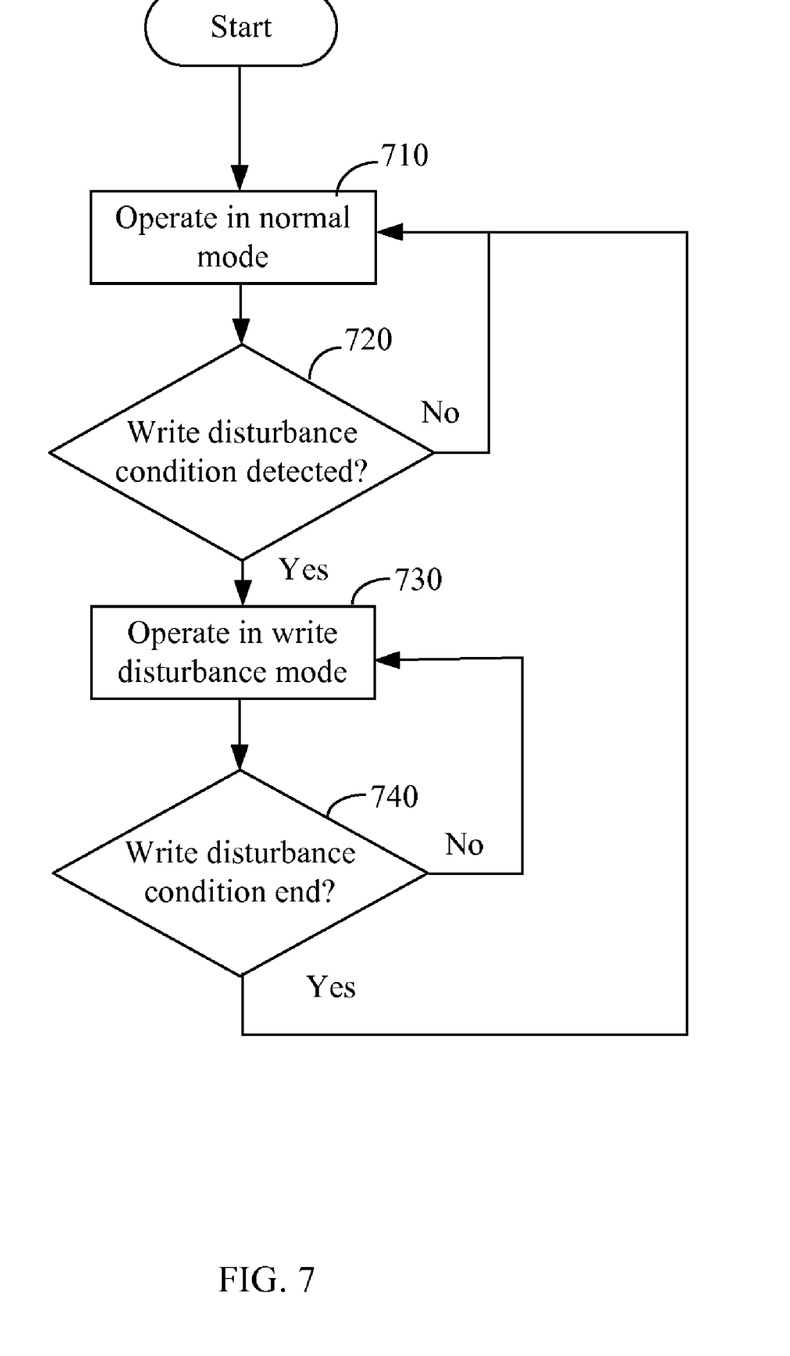
FIG. 7 is a flowchart illustrating a method for writing data to a disk according to an embodiment of the present invention.

A method of writing data to a disk that may be performed by the controller 150 will now be discussed with reference to FIG. 7.

In step 710, the controller 150 operates in the normal mode. In step 720, the controller 150 determines whether the write disturbance detection system 155 has detected a write disturbance condition. If the write disturbance detection system 155 has not detected a write disturbance condition, then the controller 155 continues to operate in the normal mode in step 710. If the write disturbance detection system 155 has detected a write disturbance condition, then the controller 150 switches to the write disturbance mode in step 730. As discussed above, the controller 150 may write data to tracks that are spaced farther apart in the write disturbance mode compared with the normal mode to increase the tolerance of the disk drive 110 to the write disturbance condition.

In step 740, the controller 155 determines whether the write disturbance system 155 has stopped detecting the write disturbance condition. If the write disturbance detection system 155 is still detecting the write disturbance condition, then the controller 150 continues to operate in the write disturbance mode in step 730. If the write disturbance detection system 155 has stopped detecting the write disturbance condition, then the controller 150 switches back to the normal mode in step 710. While in the normal mode, the controller 150 may later transfer the data that was written to the write disturbance area during the write disturbance mode to the normal write area of the disk 115. The data transfer may be performed when the disk drive 100 is in an idle state so as not to impact read and/or write performance for host commands.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive comprising:
    a disk;
    a detection system configured to detect a write disturbance condition; and
    a controller configured to alternately operate in a normal mode and a write disturbance mode, wherein, the controller is configured to write data to data tracks on the disk in the normal mode and to write data to data tracks on the disk that are spaced farther apart in the write disturbance mode, and the controller is configured to switch from the normal mode to the write disturbance mode when the detection system detects the write disturbance condition, and wherein, in the write disturbance mode, the controller is configured to write data to every $n^{th}$ data track on the disk, where n is equal to or greater than 2.

2. The disk drive of claim 1, wherein the controller is configured to write data within a first area of the disk in the normal mode, to write data within a second area of the disk in the write disturbance mode, and, after the detection system stops detecting the write disturbance condition, to transfer data from the second area of the disk to the first area of the disk.

3. The disk drive of claim 2, wherein the controller is configured to transfer the data when the disk drive is in an idle state.

4. The disk drive of claim 2, wherein the controller is configured to maintain a table including logical block address entries for data stored in the second area of the disk and to clear or invalid the logical block address entries when the data is transferred to the first area of the disk.

5. The disk drive of claim 2, wherein the second area of the disk has a lower tracks per inch (TPI) than the first area of the disk.

6. The disk drive of claim 1, wherein, in the normal mode, the controller is configured to abort a write operation when a position error signal (PES) exceeds a first write unsafe (WUS) limit, and, in the write disturbance mode, the controller is configured to abort a write operation when the PES exceeds a second WUS limit, wherein the second WUS limit is higher than the first WUS limit.

7. The disk drive of claim 6, wherein the first and second WUS limit is based on a data track pitch.

8. The disk drive of claim 1, wherein the write disturbance condition is associated with high vibrations in the disk drive.

9. The disk drive of claim 1, wherein the detection system is configured to monitor a position error signal (PES) of the disk drive, to determine a variation of the PES over time, and to detect the write disturbance condition when the variation of the PES exceeds a threshold.

10. The disk drive of claim 1, wherein the detection system comprises a vibration sensor configured to detect vibrations of the disk drive.

11. The disk drive of claim 1, wherein the detection system is configured to monitor detected shock events of the disk drive and to detect the write disturbance condition when a number of the detected shock events exceeds a certain number within a time window.

12. The disk drive of claim 1, wherein the detection system is configured to monitor write aborts of the disk drive and to detect the write disturbance condition when a number of the write aborts exceeds a certain number within a time window.

13. A disk drive comprising:
    disk;
    a detection system configured to detect a write disturbance condition; and
    a controller configured to alternately operate in a normal mode and a write disturbance mode, wherein, the controller is configured to write data to data tracks on the disk in the normal mode and to write data to data tracks on the disk that are spaced farther apart in the write disturbance mode, and the controller is configured to switch from the normal mode to the write disturbance mode when the detection system detects the write disturbance condition, wherein the controller is configured to write rata within a first area of the disk in the normal mode, to write data within a second area of the disk in the write disturbance mode, and, after the detection system stops detecting the write disturbance condition, to transfer data from the second area of the disk to the first area of the disk, wherein the controller is configured to transfer the data when the disk drive is in an idle state, and wherein the controller is configured to transfer the data by performing on-track and off-track reads of the data within the second area of the disk and writing the read data within the first area of the disk.

14. The disk drive of claim 13, wherein, in the write disturbance mode, the controller writes data to data tracks on the disk that are spaced at least 50% father apart than in the normal mode.

15. A disk drive comprising:
a disk;
a detection system configured to detect a write disturbance condition,
wherein the detection system is configured to monitor a position error signal (PES) of the disk drive, to determine a variation of the over time, and to detect the write disturbance condition when the variation of the PES exceeds a threshold, and
wherein the detection system is configured to determine the variation of the PES by computing a standard deviation of the PES; and
a controller configured to alternately operate in a normal mode and a write disturbance mode, wherein the controller is configured to write data to data tracks on the disk in the normal mode and to write data to data tracks on the disk that are spaced farther apart in the write disturbance mode, and the controller is configured to switch from the normal mode to the write disturbance mode when the detection system detects the write disturbance condition.

16. A method for writing data to a disk, comprising:
writing data to data tracks on the disk in a normal mode;
detecting a write disturbance condition; and
in response to the write disturbance condition, writing data to data tracks on the disk that are spaced farther apart in a write disturbance mode, wherein writing data in the write disturbance mode comprises writing data to every $n^{th}$ data track on the disk, where n is equal to or greater than 2.

17. The method of claim 16, further comprising:
detecting an end of the write disturbance condition; and
after detecting the end of the write disturbance condition, transferring data from an area of the disk associated with the write disturbance mode to an area of the disk associated with the normal mode.

18. The method of claim 17, wherein the area of the disk associated with the write disturbance mode has a lower tracks per inch (TPI) than the area of the disk associated with the normal mode.

19. The method of claim 17, further comprising:
maintain a table including logical block address entries for data stored in the area of the disk associated with the write disturbance mode; and
clearing or invaliding the logical block address entries when the data is transferred to the area of the disk associated with the normal mode.

20. The method of claim 16, wherein the write disturbance condition is associated with high vibrations in the disk drive.

21. The method of claim 16, wherein the detecting the write disturbance condition comprises:
monitoring a position error signal (PES) of the disk drive;
determining a variation of the PES over time; and
detecting the write disturbance condition when the variation of the PES exceeds a threshold.

22. The method of claim 16, wherein the detecting the write disturbance condition comprises monitoring signals from a vibration sensor in the disk drive.

23. The method of claim 16, wherein the detecting the write disturbance condition comprises:
monitoring detected shock events of the disk drive; and
detecting the write disturbance condition when a number of the detected shock events exceeds a certain number within a time window.

24. The method of claim 16, wherein the detecting the write disturbance condition comprises:
monitoring write aborts of the disk drive; and
detecting the write disturbance condition when a number of the write aborts exceeds a certain number within a time window.

25. A method for writing data to a disk, comprising
writing data to data tracks on the disk in a normal mode;
detecting a write disturbance condition;
in response to the write disturbance condition, writing data to data tracks on the disk that are spaced farther apart in a write disturbance mode;
detecting an end of the write disturbance condition; and
after detecting the end of the write disturbance condition, transferring data from an area of the disk associated with the write disturbance more to an area of the disk associated with the normal mode, wherein the transferring the data comprises:
performing on-track and off-track reads of the data from the area of the disk associated with the write disturbance mode; and
writing the read data within the area of the disk associated with the normal mode.

26. The method of claim 25, wherein the data tracks in the write disturbance mode are spaced at least 50% father apart than in the normal mode.

27. A method for writing data to a disk, comprising:
writing data to data tracks on the disk in a normal mode;
detecting a write disturbance condition based on monitoring a position error signal (PES) of the disk, determining a variation of the PES over time by computing a standard deviation of the PES, and detecting when the variation of the PES exceeds a threshold; and
in response to the write disturbance condition, writing data to data tracks on the disk that are spaced farther apart in a write disturbance mode.

* * * * *